(12) United States Patent
Potkonjak et al.

(10) Patent No.: US 8,387,071 B2
(45) Date of Patent: Feb. 26, 2013

(54) CONTROLLING INTEGRATED CIRCUITS INCLUDING REMOTE ACTIVATION OR DEACTIVATION

(75) Inventors: Miodrag Potkonjak, Los Angeles, CA (US); Farinaz Koushanfar, Houston, TX (US)

(73) Assignee: Empire Technology Development, LLC, Wilmington, DE (US)

( * ) Notice: Subject to any disclaimer, the term of this patent is extended or adjusted under 35 U.S.C. 154(b) by 713 days.

(21) Appl. No.: 12/550,132

(22) Filed: Aug. 28, 2009

(65) Prior Publication Data

US 2011/0055851 A1 Mar. 3, 2011

(51) Int. Cl.
*G06F 9/44* (2006.01)
(52) U.S. Cl. .......................... 719/318; 326/8
(58) Field of Classification Search .............. None
See application file for complete search history.

(56) References Cited

U.S. PATENT DOCUMENTS

2010/0122353 A1* 5/2010 Koushanfar et al. .......... 726/33
2010/0293612 A1* 11/2010 Potkonjak ................... 726/20

FOREIGN PATENT DOCUMENTS

WO 2009024913 2/2009
WO 2010060005 5/2010

OTHER PUBLICATIONS

Alkabani et al., "Remote Activation of ICs for Piracy Prevention and Digital Right Management," Proceedings of the 2007 IEEE/ACM International Conference on Computer-aided Design, Nov. 2007, pp. 674-677.*
Alkabani et al., "Active Hardware Metering for Intellectual Property Protection and Security," Proceedings of the 16th USENIX Security Symposium, Aug. 2007, pp. 291-306.*
International Search Report and Written Opinion, issued in International Patent Application No. PCT/US2010/045004, mailed Oct. 25, 2010, 13 pages.
Hammouri et al., "Novel PUF-based Error Detection Methods in Finite State Machines," Proceedings of the 11th International Conference on Information Security and Cryptology, Dec. 2008, 18 pages.
Alkabani et al., "Input Vector Control for Post-Silicon Leakage Current Minimization in the Presence of Manufacturing Variability," Design Automation Conference 2008, Jun. 2008, pp. 606-609.
Alkabani et al., "Trusted Integrated Circuits: A Nondestructive Hidden Characteristics Extraction Approach," Information Hiding: 10th International Workshop, May 2008, pp. 102-117.
Beckmann et al., "Hardware-Based Public-Key Cryptography with Public Physically Unclonable Functions," Information Hiding: 11th International Workshop, Jun. 2009, pp. 206-220.
Dabiri et al., "Hardware Aging-Based Software Metering," Proceedings of the Conference on Design, Automation and Test in Europe, Apr. 2009, pp. 460-465.

(Continued)

*Primary Examiner* — Crystal L Hammond
(74) *Attorney, Agent, or Firm* — Steven S. Rubin, Esq.; Moritt Hock & Hamroff LLP

(57) ABSTRACT

Techniques are generally described for transitioning a Finite State Machine (FSM) of an integrated circuit from a first state to a second state or a replicated variant of the second state in lieu of the second state, and out of the replicated variant of the second state, using a robust physically unclonable function (PUF), an event generator and a control block of the IC. In various embodiments, the techniques leverage on manufacturing variability of the IC. In various embodiments, the techniques are employed to control activation or deactivation of the IC. Other embodiments may be disclosed and claimed.

21 Claims, 8 Drawing Sheets

OTHER PUBLICATIONS

Gassend et al., "Identification and Authentication of Integrated Circuits," Concurrency and Computation: Practice and Experience, 2004, pp. 1077-1098, vol. 16, No. 11.

Koushanfar et al., "CAD-based Security, Cryptography, and Digital Rights Management," ACM/IEEE-CAS/EDAC Design Automation Conference, Jun. 2007, pp. 268-269.

Koushanfar et al., "Intellectual Property Metering," Information Hiding: 4th International Workshop, Apr. 2001, pp. 81-95.

Lofstrom et al., "IC Identification Circuits using Device Mismatch," IEEE International Solid State Circuits Conference, May 2000, pp. 372-373.

Maeda et al., "An Artificial Fingerprint Device (AFD): A Study of Identification Number Applications Utilizing Characteristics Variation of Polycrystalline Silicon TFTs," IEEE Transactions on Electron Devices, Jun. 2003, pp. 1451-1458, vol. 50, No. 6.

Majzoobi et al., "Lightweight Secure PUFs," International Conference on Computer Aided Design, Nov. 2008, pp. 670-673.

Majzoobi et al., "Testing Techniques for Hardware Security," IEEE International Test Conference, Oct. 2008, pp. 1-10.

Nelson et al., "SVD-Based Ghost Circuitry Detection," Information Hiding: 11th International Workshop, Jun. 2009, pp. 221-234.

Potkonjak et al., "(Bio)-Behavioral CAD," 45th Design Automation Conference, Jun. 2008, pp. 351-352.

Potkonjak et al., "Hardware Trojan Horse Detection Using Gate-Level Characterization", 46th Design Automation Conference, Jul. 2009, pp. 688-693.

Potkonjak et al., "Trusted Sensors and Remote Sensing," 9th Annual IEEE Conference on Sensors, Nov. 2010, 4 pages.

Potkonjak, M., "Synthesis of Trustable ICs using Untrusted CAD Tools," 47th ACM/IEEE Design Automation Conference, Jun. 2010, pp. 633-634.

Vahdatpour et al., "Leakage Minimization Using Self Sensing and Thermal Management," International Symposium on Low Power Electronics and Design, Aug. 2010, 6 pages.

Vahdatpour et al., "A Gate Level Sensor Network for Integrated Circuits Temperature Monitoring," 9th Annual IEEE Conference on Sensors, Nov. 2010, 4 pages.

Wei et al., "Gate-Level Characterization: Foundations and Hardware Security Applications," 47th ACM/IEEE Design Automation Conference, Jun. 2010, pp. 222-227.

Wei et al., "Scalable Segmentation-Based Malicious Circuitry Detection and Diagnosis", International Conference on Computer Aided Design, Nov. 2010, pp. 4 pages.

Bolotnyy, L. and Robins, G., "Physically Unclonable Function-Based Security and Privacy in RFID Systems," Pervasive Computing and Communications, Mar. 19-23, 2007, pp. 211-220.

Elliptic Curve Cryptography, "Certicom," accessed at http://www.certicom.com, accessed on May 1,2012.

Gassend, B., et al., "Delay-Based Circuit Authentication and Applications," ACM symposium on Applied computing, 2003, pp. 294-301.

Gassend, B., et al., "Silicon Physical Random Functions," In ACM conference on Computer and communications security, Nov. 18, 2002, pp. 148-160.

Guajardo, J., et al., "FPGA intrinsic PUFs and their use for IP protection," Proceedings of the 9th international workshop on Cryptographic Hardware and Embedded Systems, Sep. 20, 2007.

Koushanfar, F. and Qu. G., "Hardware metering," Proceedings in Design Automation Conference, 2001, pp. 490-493.

Lach, J., et al., "Fingerprinting Digital Circuits on Programmable Hardware," In Information Hiding Workshop, 1998, pp. 16-32.

Lach, J., et al., "Signature Hiding Techniques for FPGA Intellectual Property Protection," International Conference on Computer-Aided Design, Nov. 8-12, 1998, pp. 186-189.

Lee, D. and Yannakakis, M., "Principles and Methods of Testing Finite State Machines—A Survey," Proceedings of the IEEE, Aug. 1996, vol. 84, No. 8, pp. 1090-1123.

Lee, J.W., et al., "A Technique to Build a Secret Key in Integrated Circuits for Identification and Authentication Applications," in Symposium of VLSI Circuits, 2004, pp. 176-179.

Oliveira, A.L., "Techniques for the Creation of Digital Watermarks in Sequential Circuit Designs," IEEE Transactions on Computer-Aided Design of Integrated Circuits and Systems, Sep. 2001, vol. 20, No. 9, pp. 1101-1117.

Pappu, R., et al., "Physical One-Way Functions," Science, Sep. 20, 2002, vol. 297, No. 5589, pp. 2026-2030.

Ravi, S., et al., "Security in Embedded Systems: Design Challenges," ACM Transaction on Embedded Computing Sytems, vol. 3, No. 3, pp. 461-491.

Roy, J. A., et al., "EPIC: Ending Piracy of Integrated Circuits" Design, Automation and Test in Europe, Mar. 10-14, 2008, pp. 1069-1074.

Roy, J. A., et al., "Extended Abstract: Circuit CAD Tools as a Security Threat," Hardware-Oriented Security and Trust Workshop, 2008, pp. 68-69.

Roy, J., et al., "Protecting bus-based hardware IP by secret sharing," Proceedings of the 45th annual conference on Design automation, Jun. 8-13, 2008, pp. 846-851.

Su, Y., et al., "A 1.6J/bit stable chip ID generating circuit using process variations," In Proceedings of the International State Solid State Circuits Conference, 2007, pp. 406-407.

Suh, G.E. and Devadas, S., "Physical Unclonable Functions for Device Authentication and Secret Key Generation," In Design Automation Conference, Jun. 4-8, 2007, pp. 9-14.

Yuan, L. and Qu, G. "Information Hiding in Finite State Machine," In Information Hiding Workshop, 2004, pp. 340-354.

International Preliminary Report on Patentability, issued Feb. 28, 2012 for PCT/US2010/045004, 12 pages.

* cited by examiner

800 An article of manufacture having a computer program product 832 a computer readable storage medium 834 Instructions to control an IC
   one or more instructions for determining a key to be stored in an IC to respond to an output of a PUF of the IC to control the IC; and/or
   one or more instructions for providing an input to the IC to cause an event generator of the IC to generate an event for the PUF to produce the output.

CONTROLLING INTEGRATED CIRCUITS INCLUDING REMOTE ACTIVATION OR DEACTIVATION

BACKGROUND

Advances in integrating circuit (IC) technology have led to wide spread adoption of IC in numerous applications. For various reasons, e.g. protection of intellectual property, prevention of counterfeits, and so forth, applications may desire to have activation or deactivation of ICs controlled, in particular, remotely and/or wirelessly controlled.

Random process variations in modern manufacturing may lead to inherent variability in integrated circuits. This variability may result in unclonable physical structures unique to each integrated circuit. An unclonable physical structure may be used to define a Physically Unclonable Function (PUF) that maps a set of challenges, otherwise known as inputs, to a corresponding set of outputs, otherwise known as responses, from the PUF. One example of a PUF may be a delay-based silicon PUF which may endow a chip including the PUF with unique delay characteristics. However, many PUFs are relatively unstable, may be sensitive to operating conditions, e.g., temperature, age, variance in voltage supply, and so forth.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope. The disclosure will be described with additional specificity and detail through use of the accompanying drawings:

FIG. 8 illustrates an example article of manufacture having a computer program product, all arranged in accordance with various embodiments of the present disclosure.

DETAILED DESCRIPTION OF EMBODIMENTS

Figure 1:
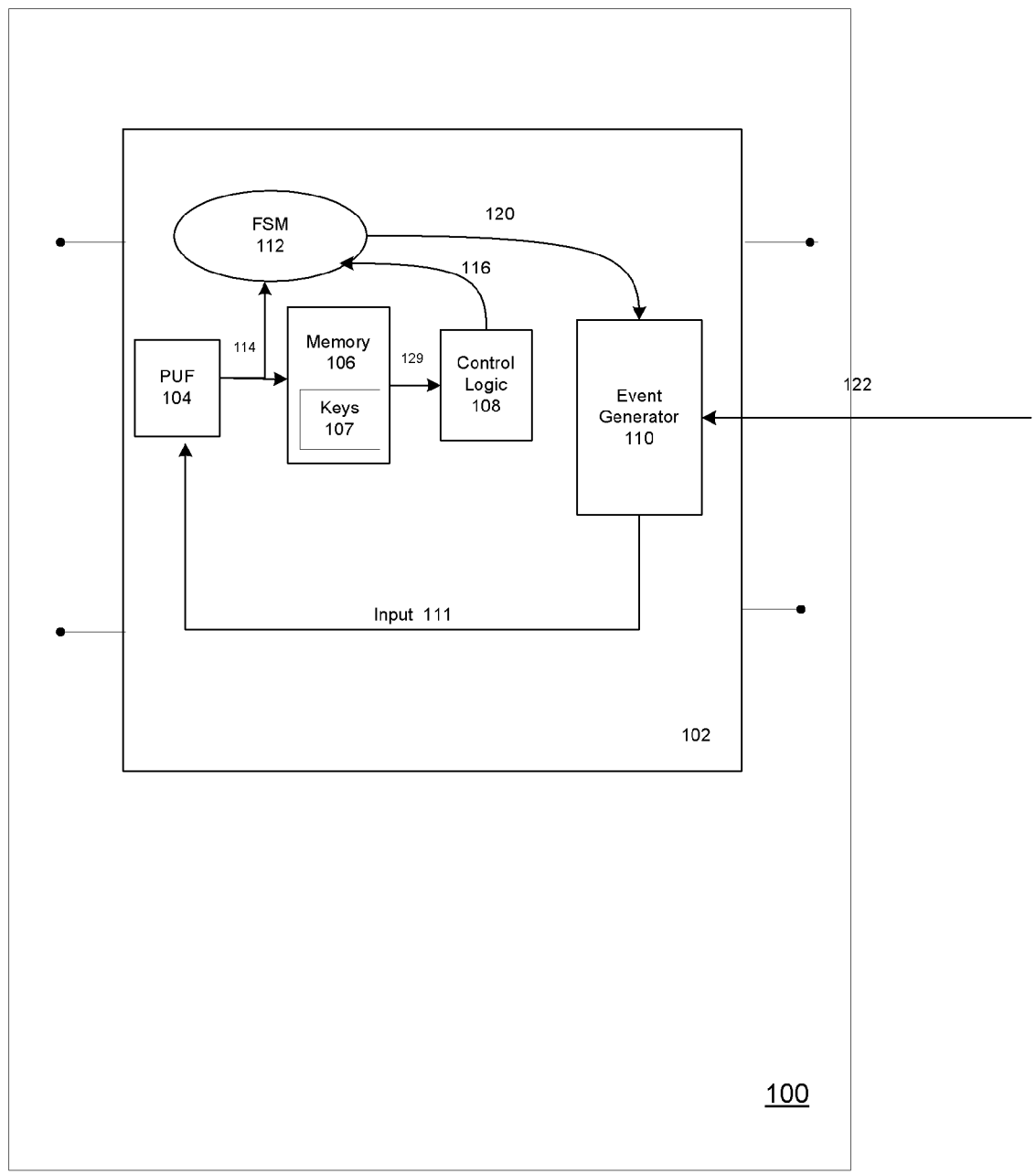
FIG. 1 is a block diagram illustrative of a device having an integrated circuit including a PUF.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

In the following description, algorithms and/or symbolic representations of operations on data bits and/or binary digital signals stored within a computing system, such as within a computer and/or computing system memory may be presented. An algorithm is generally considered to be a self-consistent sequence of operations and/or similar processing leading to a desired result where the operations may involve physical manipulations of physical quantities that may take the form of electrical, magnetic and/or electromagnetic signals capable of being stored, transferred, combined, compared and/or otherwise manipulated. In various contexts such signals may be referred to as bits, data, values, elements, symbols, characters, terms, numbers, numerals, etc. Those skilled in the art will recognize, however, that such terms may be used to connote physical quantities. Hence, when terms such as "storing", "processing", "retrieving", "calculating", "determining" etc. are used in this description they may refer to the actions of a computing platform, such as a computer or a similar electronic computing device such as a cellular telephone, that manipulates and/or transforms data represented as physical quantities including electronic and/or magnetic quantities within the computing platform's processors, memories, registers, etc.

Turning now to FIG. 1, which is a block diagram illustrative of a device 100 having an integrated circuit 102 including a PUF 104 in accordance with various embodiments of the present disclosure. In some embodiments, device 100 may include an integrated circuit (IC) 102 having PUF 104, finite state machine (FSM) 112 and event generator 110 coupled to each other as shown. In some embodiments, PUF 104 may be a robust PUF, meaning operates deterministically or predictably within a desired range of operating conditions, e.g. temperature, age, variance of voltage supply. The robustness may be achieved with auxiliary circuit elements to the core elements forming the nominal PUF, to be described more fully below. In some embodiments, device 100 may be a cellular phone, a computer such as a desktop or laptop computer, an RFID device, or other devices of the like. As illustrated, PUF 104 may be coupled to receive an input 111 from event generator 110. In some embodiments, input 111 may include one or more challenges to cause PUF 104 to provide an output or response 114 to FSM 112 to control state transitions of FSM 112, to be described more fully below.

In some embodiments, device 100 may also include memory 106 and control logic 108, coupled to each other, and to PUF 104, FSM 112 and event generator 110 as shown. For the embodiments, PUF 104 may also be configured to provide the response 114 to memory 106. Memory 106 may include stored keys 107. In some embodiments, response 114 may correspond to a key 107 stored in memory 106. Key 107 may provide a value 129 to control logic 108. Control logic 108 may provide a control signal 116 to FSM 112 in response to the value 129. In some embodiments, control signal 116 may control one or more transitions between one or more states of FSM 112, also to be described more fully below.

In various embodiments, one or more of stored keys 107 may be determined, using e.g. a computing device, from a unique response of PUF 104 resulting from an intrinsic manufacturing variability of IC 102, intentional manufacturing variability of IC 102 or a combination of both. Thus, in some embodiments, unique inputs 111, including challenges received by PUF 104, may result in unique responses 114 generated or provided by PUF 104.

In various embodiments, one or more keys 107 so determined, may be stored in memory 106 at a manufacturing time of IC 102. In other embodiments, one or more keys 107 so determined may be stored in memory 106 at a later time.

Further, as illustrated, in some embodiments, event generator 110 may be coupled to receive a first signal 120 and/or a second signal 122. In some embodiments, as will be discussed in more detail below, FSM 112 may provide a first signal 120 to event generator 110 where the first signal includes FSM data indicative of a particular state of FSM 112. In response to first signal 120, event generator 110 may then generate a specific event. In other implementations, an external source may provide a second signal 122 to event generator 110. In some embodiments, second signal 122 may include external data and, thus, event generator 110 may then generate a specific event in response to the external data. Event generator 110 may provide an input 111 for PUF 104 in response to the specific event. As will be discussed further with respect to FIG. 2, various states of FSM 112 may cause an activation or a deactivation of IC 102 by locking or unlocking IC 102. In some embodiments, transmitting an input to IC 102 integrated circuit may thus include remotely controlling an activation or deactivation of the integrated circuit via wired or wireless connection.

Figure 2:
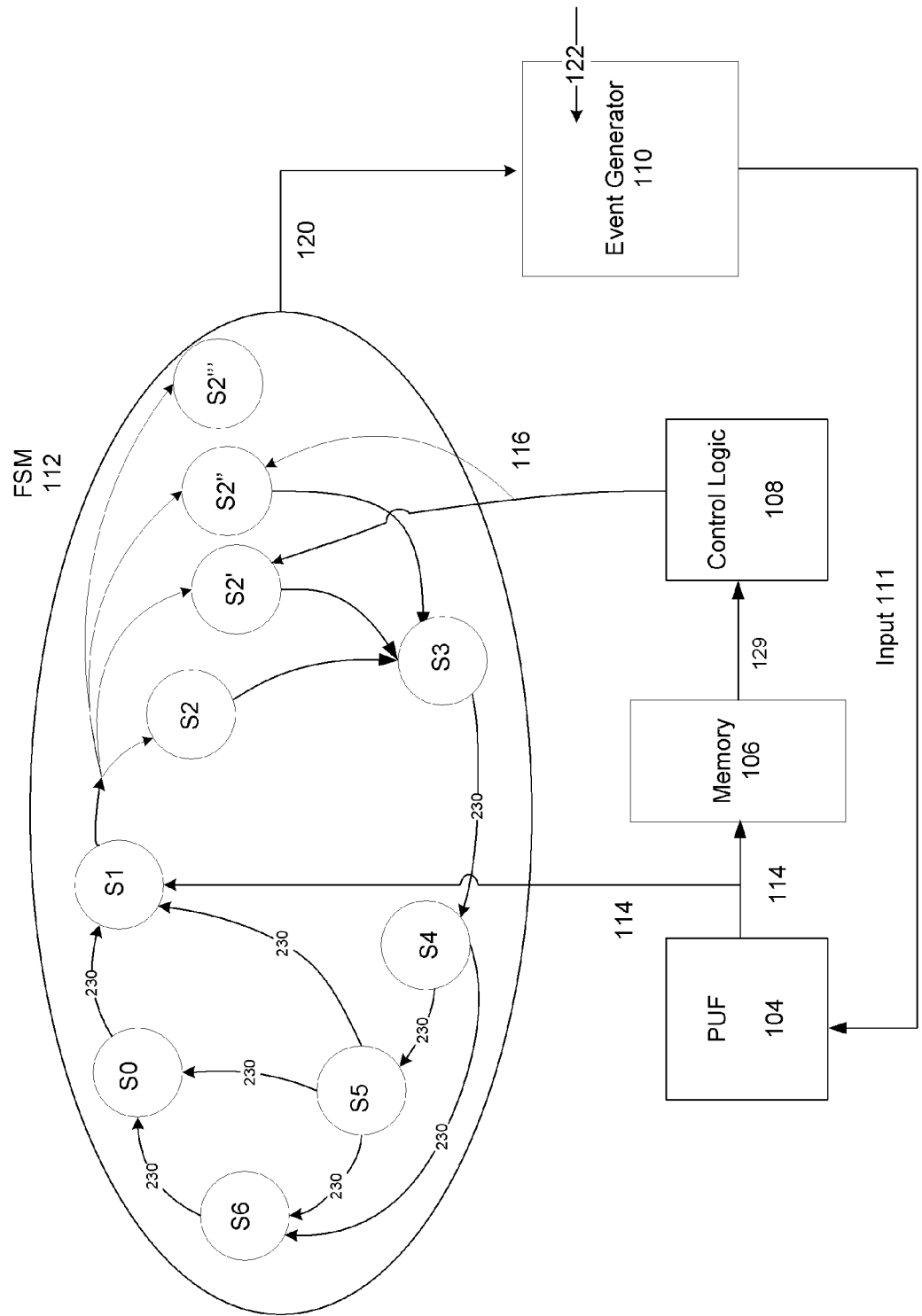
FIG. 2 illustrates in further detail various components of the block diagram of FIG. 1.

FIG. 2 illustrates in further detail various components of the block diagram of FIG. 1 in accordance with various embodiments of the present disclosure. In particular, in the illustrated embodiments, FSM 112 may include example states S0-S6 that are part of a functional design of IC 102, as well as three example replicated states, S2', S2", and S2'" are replicated variant of state S2 introduced into the functional design for the purpose of controlling IC. In some embodiments, each of example states S0-S6, as well as replicated variant states S2' S2" and S2'" may be associated with a respective set of functions. In various embodiments, replicated variant states S2' S2" and S2'" may each include a subset of the functions associated with state S2. In some embodiments, FSM 112 may transition between S0-S6 along various segments of a path shown by solid line 230. In some embodiments, an uninterrupted transition between S0-S6 may indicate an unlocked or operational state of IC 102.

In some embodiments, as discussed with respect to FIG. 1, event generator 110 may be coupled to receive one or both of a first signal 120 and a second signal 122. In response to one or both of first signal 120 or second signal 122, event generator 110 may generate an event. From the event, event generator 110 may determine and send an input 111 to PUF 104. In some embodiments, input 111 may include an appropriate set of challenges so that PUF 104 may, upon receiving input 111, provide a corresponding response 114 to FSM 112 to control or determine whether FSM 112 is to transition from state S1 to state S2, or to one of the replicated variant state of S2, S2',S2" or S2'" in lieu of state S2. In some embodiments, unlike state S2, states S2' and S2" may be states which do not transition to S3 unless control signal 116 allows such transition. In various embodiments, as alluded to earlier, S2 may be a state including a full set of functions for IC 102 while S2', S2" and/or S2'" may correspond to variants of state S2 that include a reduced or limited set of the functions associated with state S2. In various embodiments, S2'" may be associated with a null set of functions, which may represent a locked or disabled state of IC 102.

Thus, in various embodiments, IC 102 may be partially or completely locked at one of states S2', S2" or S2'", and may not be unlocked until control signal 116 is received. In some embodiments, FSM 112 may include a "black hole" state, (e.g., S2'") such that once FSM 112 moves from S1 to S2'" due to response 114 provided by PUF circuit 104, FSM 112 may not transition from S2'" to S3. Thus, in various embodiments, FSM 112 may become permanently locked and may remain in an unrecoverable state, also may be referred as a black hole state. States S2' or S2" may be referred to as "gray hole" states, whereby FSM 112 may eventually transition out off to S3, provided if a correct key 207 is stored in memory 206.

Figure 3:
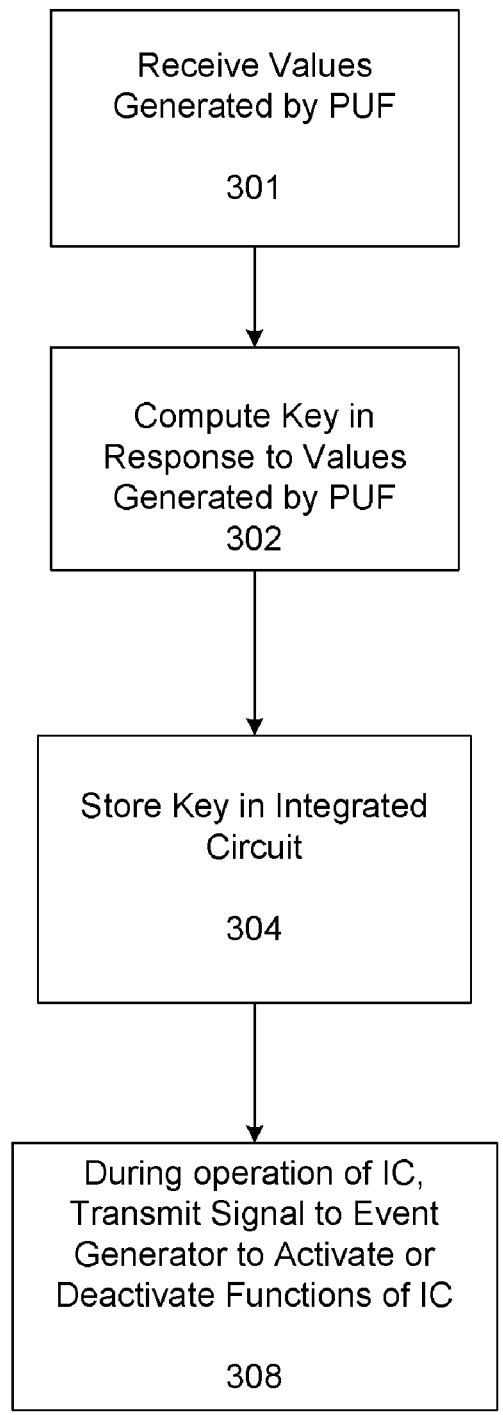
FIG. 3 is a flow chart illustrating an example method associated with the block diagrams of FIGS. 1 and 2.

FIG. 3 is a flow chart illustrating an example method 300 associated with the block diagrams of FIGS. 1 and 2, in accordance with various embodiments of the present disclosure. The process illustrated in FIG. 3, and other processes described herein, set forth various functional blocks that may be described as processing steps, functional operations, events and/or acts, etc., and that may be performed by hardware, software or any combination thereof. Those skilled in the art in light of the present disclosure will recognize that numerous alternatives to the functional blocks shown in FIG. 3 may be practiced in various implementations.

At a block 301 (Receive values generated by PUF), in some embodiments, one or more values or responses 114 generated by a PUF 104 embedded in IC 102 may be received by a computing device. These responses 114 may be generated or provided by PUF 104 in response to inputs 111. These inputs 111 may be unique and may include challenges to PUF 104. In some embodiments, the method may proceed from block 301 to block 302 (Compute key in response to values generated by PUF). At block 302, a computing device may be used to determine or compute a key in response to the values generated by the PUF 104. In various embodiments, the method may proceed from block 302 to block 304 (Store key in integrated circuit). At block 304, one or more of the keys may be stored into IC 102. In some embodiments, the stored keys such as stored keys 107 of FIG. 1 may correspond to certain transitions of FSM 112 in IC 102, or in other words, a certain functionality of IC 102. In some embodiments, the method may proceed from block 304 to block 308 (during operation of IC, transmit signal to event generator to activate or deactivate functions of IC). At block 308, as shown, a signal may be transmitted to Event Generator 110 to control an activation or deactivation of IC 102. In some embodiments, the signal may be transmitted during an operation of IC 102. In some embodiments, a deactivation of IC 102 may be effected in response to a disabled transition between states of FSM 112, for example, from S1 to S2', S2'" or S2'". In some embodiments, an activation of IC 102 may be effected in response to an enabled transition between states of FSM 112 e.g. from S1 to S2. Thus, in various embodiments, controlling a transition between a first state and a second state of an FSM on the IC may include remotely applying inputs to an event generator on the IC 104.

Figure 4:
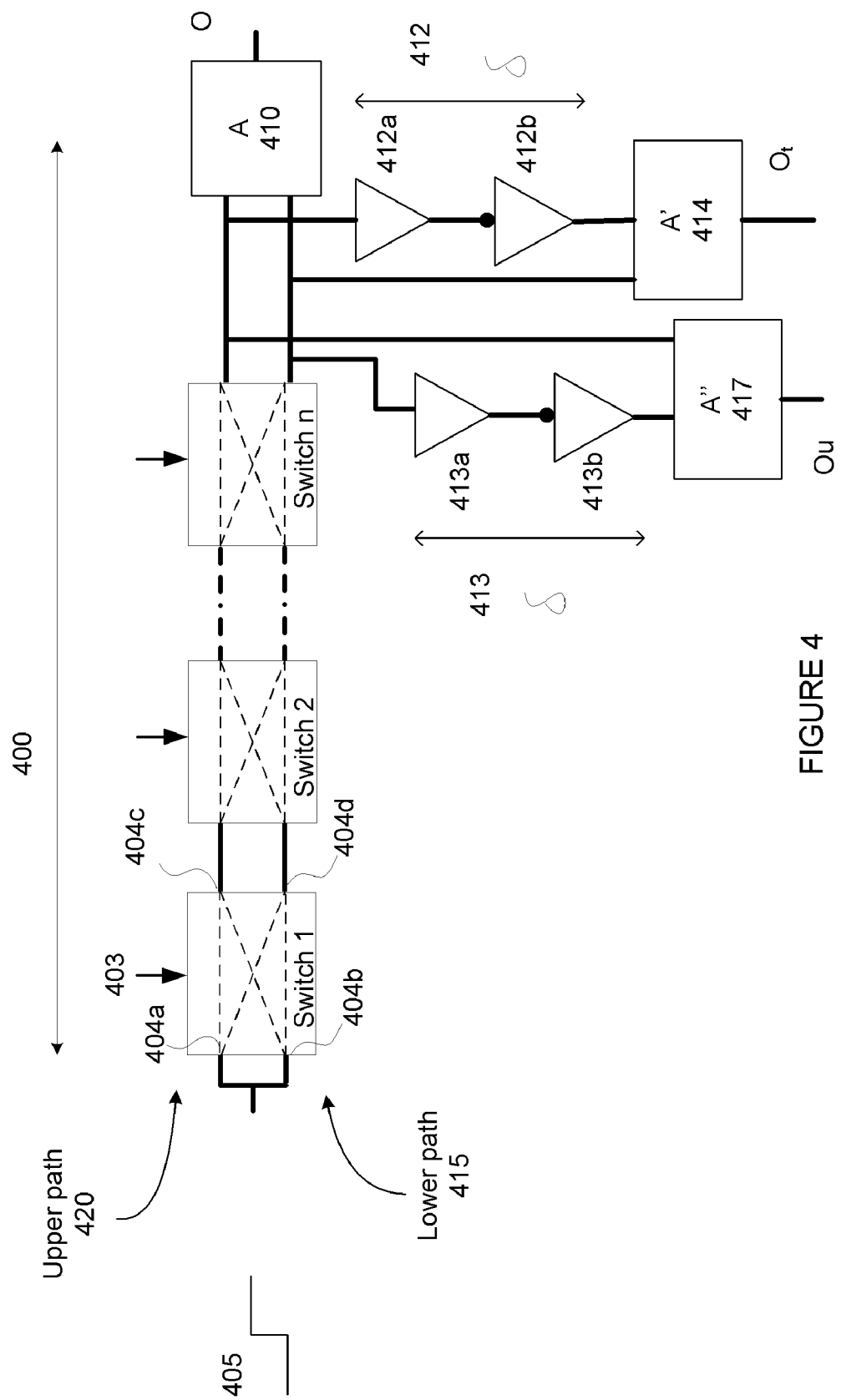
FIG. 4 is illustrative of an example of robust PUF that may be included in the embodiments of FIGS. 1 and 2.

FIG. 4 illustrates an example of robust PUF 400 that may be included in the embodiments of FIGS. 1 and 2, in accordance with various embodiments of the present disclosure. In some embodiments, PUF 400 may be a linear delay-based PUF configured to improve a stability of an output or response of PUF 400. In other words, PUF 400 may be modified, in some embodiments, to improve a likelihood that a response corresponding to a given input to PUF 400, will be substantially the same for the same input.

In some embodiments, PUF 400 may be a silicon delay-based PUF embedded in IC 102. In the embodiment shown, PUF 400 may be a 1-bit delay based PUF including n cascaded switches. In various embodiments, switches 1 through n may be cascaded to create paths such as paths 415 and 420 that may be expected to incur similar delays by construction. However, because of manufacturing variability, a signal 405 applied at each of the two paths 415 and 420 simultaneously may experience different delays on the paths 415 and 420. In embodiments, outputs of the last switch n may be connected to an arbiter such as a 2-input/1-output arbiter 410 that may be connected to an end of paths 415 and 420.

As seen in FIG. 4, each switch may have two inputs on a left side, two inputs on a right side, and a selector line. Thus, for example, switch 1 may include an upper input 404a, a lower input 404b, an upper output 404c, and a lower output 404d. In some embodiments, switch 1 may include a selector line 403 for a selector bit (note that the inputs, outputs, and selector lines of switches 2 through n have not been labeled in order to avoid obscuring FIG. 4). A selector bit may represent a challenge to the PUF 400. In some embodiments, if a value of the selector bit is zero, an upper input of a switch may be directly connected to an upper output of the switch while a lower input of the switch may be directly connected to a lower output of the switch. For example, in switch 1, if the value of the selector bit is zero, upper input 404a may be connected to upper output 404c, while lower output 404b may be connected to lower output 404d. In some embodiments, if the value of selector bit is one, an upper input (e.g. 404a) may be linked to a lower output (e.g. 404d) while the lower input (e.g. 404b) may be linked to the upper output (e.g. 404c). In some embodiments, if signal 405 on the upper path 420 arrives earlier than signal 405 from the lower path 415 at the arbiter 410, the output at arbiter 410 may be zero. Otherwise, the output at arbiter 410 may be one.

Thus, in various embodiments, as noted above, arbiter 410 may detect a delay difference, where the output of arbiter 410 indicates if lower path 415 or upper path 420 is faster. In some embodiments, d may denote the delay difference between lower path 415 and upper path 420. In some circumstances a very small d may lead to instability in a response received from PUF 400 for a same input. In some embodiments, delay differences may result from sensitivity of a latch used to implement an arbiter such as arbiter 410, where such sensitivity may be a function of environmental changes, random fluctuations, and/or aging. As indicated in previous Figures, because a response from a PUF may be integrated in a control portion of an IC design, a wrong response may result in a locked (dysfunctional) circuit even in presence of a correct key. Thus, in some embodiments, a delay difference for selected challenges may be chosen to be large enough to maintain response stability. In some embodiments, an input may include challenge bits that are selected in order to produce a large enough d that may provide a stable output for PUF 400. In various embodiments, d may be at least as large as a designer's selected delay margin $\delta$. In some embodiments, a pair of $\delta$-robustness circuits 412 and 413 to improve PUF response stability may include additional inverters such as inverters 412a and 412b that may be added to upper path 420, and inverters 413a and 413b that may be added to lower path 415, respectively. In some embodiments, a PUF may include at least one of an even number of inverters and/or a tapped delay line.

In some embodiments, an arbiter 414 and an arbiter 417 may be added to outputs of inverters 412a and 412b, and inverters 413a and 413b, respectively. In FIG. 4, a cumulative delay of inverters 412a and 412b or inverters 413a and 413b may be shown by a delay margin $\delta$. Challenges that may result in a sufficient delay to satisfy a $\delta$-robustness criteria may be found during a PUF testing phase. In some embodiments, during testing, different challenges may be input to the PUF 400 and the corresponding outputs from the arbiters 410 and 414 may be read. In FIG. 4, $O_l$ and $O_u$ may denote an output of arbiter 414 and arbiter 417, respectively. For challenges that may produce a zero value for $O_l$, a delay of the upper path 420 (denoted by $d_u$) added to $\delta$ may be less than the delay of the lower path 415 (denoted by $d_l$). In some embodiments, this result may imply that $d_l$ is at least $\delta$ longer than $d_u$. For challenges that may produce a zero value for $O_u$, a delay of the lower path 415 (denoted by $d_l$) added to $\delta$ may be less than the delay of the upper path 420 (denoted by $d_u$). In some embodiments, this result may imply that $d_u$ is at least $\delta$ longer than $d_l$. In other embodiments, a series of inverters and an arbiter may be added to the lower path 415 or upper path 420 to generate responses including both ones and zeros.

By applying challenges that satisfy a $\delta$-robustness condition, stable responses to the challenges may result. A $\delta$-robust challenge may satisfy one of the following conditions:

$d_l - d_u > \delta$ for which the extra arbiter and inverters added to the upper path generates a zero output; and $d_u - d_l > \delta$ for which the extra arbiter and inverters added to the lower path generates a one output.

In some embodiments, the delay of the $\delta$-robustness circuit 412 itself may be very low and may include an overhead incurred by two (or more) inverters and an arbiter for every path tested for robustness. Further, a multiplexer may be used to share robustness circuits among different paths. In some embodiments, values of multiplexer selection lines can be added to inputs used for testing.

Figure 5:
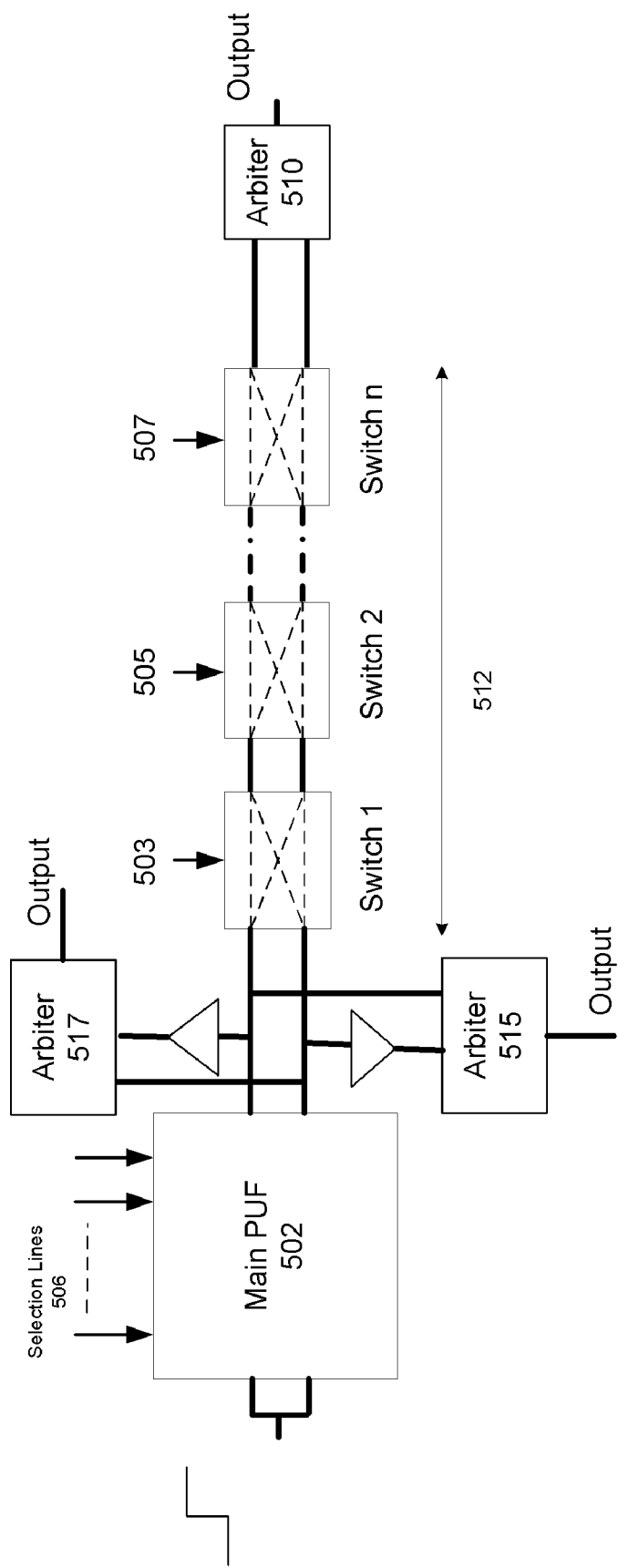
FIG. 5 is illustrative of an example of robust PUF architecture that may be included in the embodiments of FIGS. 1 and 2.

FIG. 5 illustrates another example of robust PUF that may be included in the embodiments of FIGS. 1 and 2 in accordance with various embodiments of the present disclosure. FIG. 5 includes a main PUF 502 that may be coupled to an example delay-PUF 512. In various embodiments, main PUF 502 may be of varying architecture. In some embodiments, delay-PUF 512 may be a linear PUF. In some embodiments, delay-PUF 512 may be used instead of the inverters 412a and 412b of FIG. 4 to generate the delay margin $\delta$. In some embodiments, a fixed input may be applied to selection lines 506 for selector bits of main PUF 502. The delay-PUF 504 may be reverse engineered by applying challenge bits at 503, 505, and 507 and forming a system of linear inequalities. The system of inequalities can be solved to give delays of $\delta$-PUF segments using linear programming. In some embodiments, one can generate different $\delta$ margin values if path segment delays are known for the delay-PUF 512. The described methods can be applied to any architecture for the main PUF 502. In various embodiments, additional delay elements may be coupled to the upper and lower paths respectively. The outputs of these delay elements, and the upper and lower paths may in turn be coupled in parallel to arbiters 515 and 517, respectively, to facilitate determining the relative speed or delay of the upper and lower paths.

Figure 6:
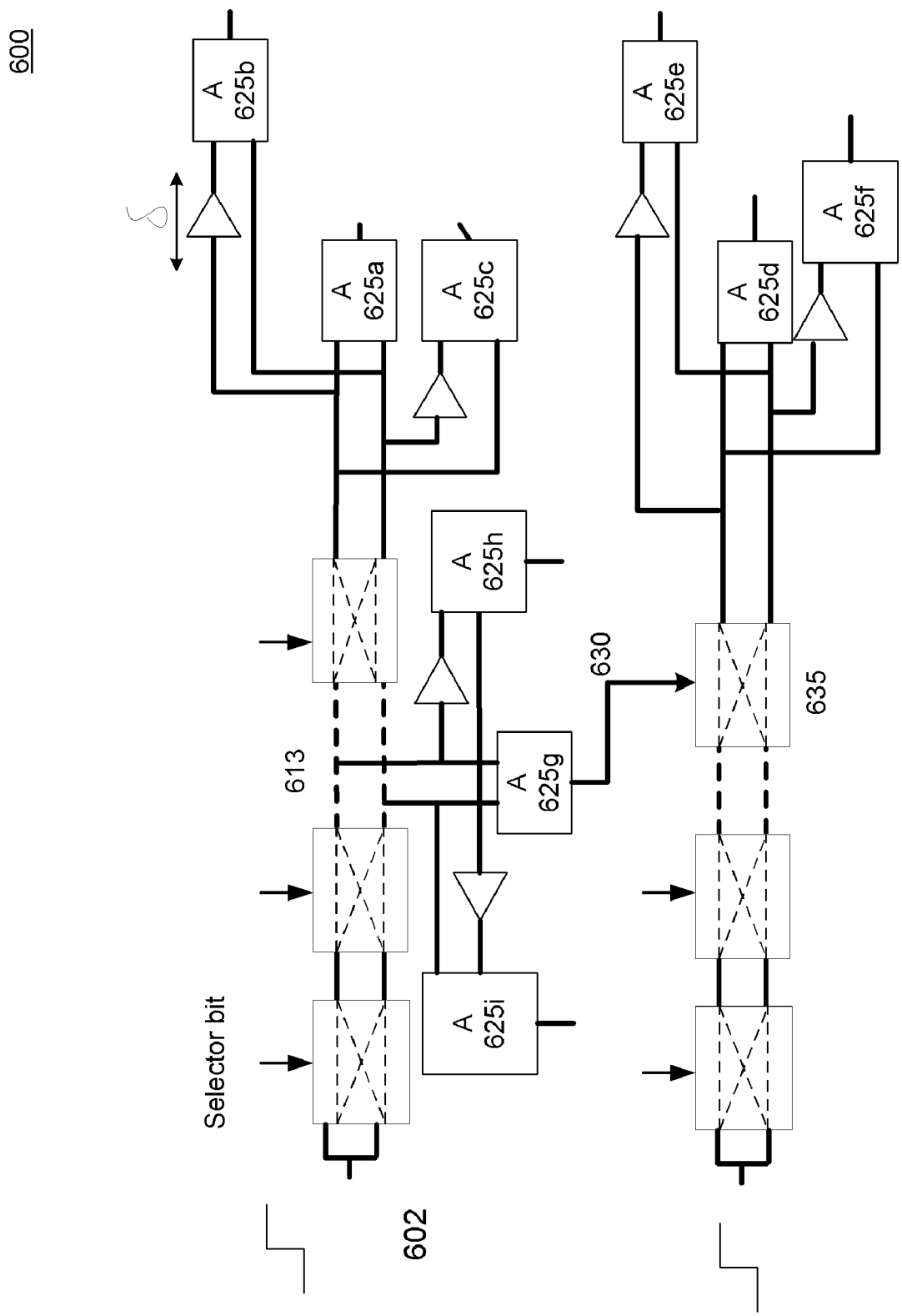
FIG. 6 is illustrative of another example of robust PUF architecture that may be included in the embodiments of FIGS. 1 and 2.

In some embodiments, a robustness circuit such as a delay-PUF 512 may be added to substantially each of the arbiters, at an output or otherwise. For example, FIG. 6 illustrates of a feed-forward PUF architecture 600 that may be included in the embodiments of FIGS. 1 and 2 in accordance with various embodiments of the present disclosure. In a feed-forward PUF 602, some internal delay segments at 613 may be intercepted by added arbiters, e.g., internal arbiter 625g-625i. The output of internal arbiter 625g may be used as a selector line 630 for a selector bit (for a forward switch 635). In some embodiments, to increase a stability of PUF 602, delay differences between internal segments may be more than δ. In some embodiments, a number of cascaded stages may be inserted before the feed-forward or internal arbiter 625 in order that a challenge that is δ-robust can be found. In some embodiments, the number of cascaded stages may include a number of stages that allow for a delay difference of δ or more. In some embodiments, additional delay elements may be coupled to the upper and lower paths leading to arbiters 625a and 625d respectively. In each case, the outputs of the delay elements and the corresponding upper and lower paths may be coupled in parallel to arbiters 625b and 625c, and 625e and 625f, respectively, to facilitate determining which of the corresponding upper or lower paths has longer delay.

In various embodiments, search for high δ-stable input challenges may be conducted in a variety of ways. One option is to start with a randomly selected challenge, and to imply iterative improvement paradigm where at each step we try all challenges $c_i$ that have Hamming distance of 1 with respect to the current challenge. If there is at least one $c_i$ challenge that has higher stability (the delay difference between the top and bottom signal paths), the new current solution may be selected as the most stable $c_i$ challenge. Thereafter, the procedure may be repeated. If there is no such challenge, the search may be enhanced to include challenges that are on Hamming distance of two, three, or more from the current challenge.

In various embodiments, termination criteria of the process may employ, one one or more of the following options:
(i) the maximal considered Hamming distance between the current and considered new challenges (e.g., small values such as 2, 3, or 4),
(ii) a user set maximal running time for the procedure,
(iii) the moment when the maximal measurable δ is achieved, and
(iv) a user set satisfactory δ value is found.

Figure 7:
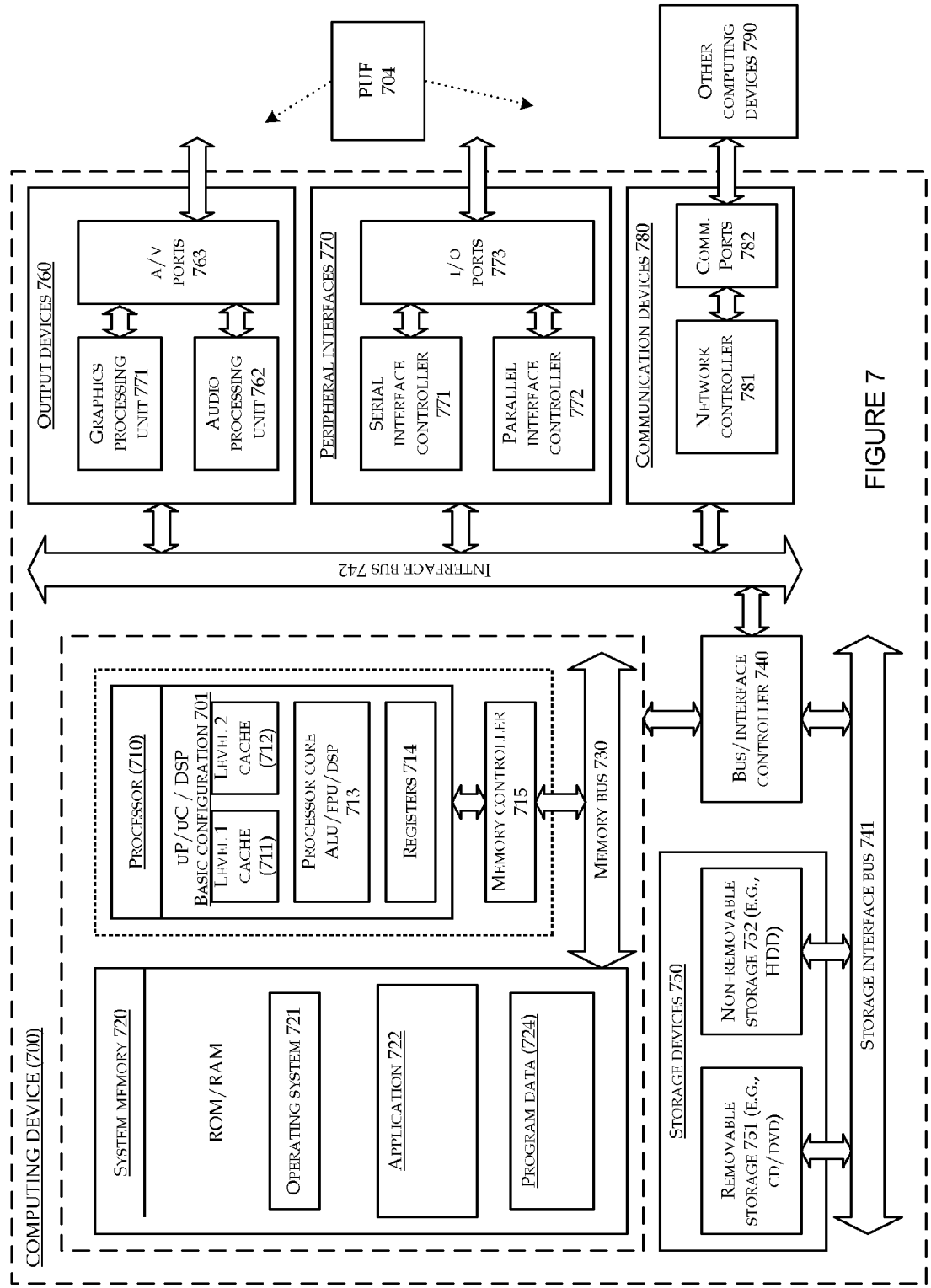
FIG. 7 illustrates an example computing system.

FIG. 7 is a block diagram illustrating an example computing device configured in accordance with embodiments of the present disclosure. In a very basic configuration 701, computing device 700 typically includes one or more processors 710 and system memory 720. A memory bus 730 may be used for communicating between the processor 710 and the system memory 720. System memory 720 may include ROM/RAM incorporating one or more embodiments of the PUF of the present disclosure.

Depending on the desired configuration, processor 710 may be of any type including but not limited to a microprocessor (μP), a microcontroller (μC), a digital signal processor (DSP), or any combination thereof. Processor 710 may include one more levels of caching, such as a level one cache 711 and a level two cache 12, a processor core 713, and registers 714. An example processor core 713 may include an arithmetic logic unit (ALU), a floating point unit (FPU), a digital signal processing core (DSP Core), or any combination thereof. An example memory controller 715 may also be used with the processor 710, or in some implementations the memory controller 715 may be an internal part of the processor 710. Depending on the desired configuration, the system memory 720 may be of any type including but not limited to volatile memory (such as RAM), non-volatile memory (such as ROM, flash memory, etc.) or any combination thereof. System memory 720 may include an operating system 721, one or more applications 722, and program data 724.

Computing device 700 may have additional features or functionality, and additional interfaces to facilitate communications between the basic configuration 701 and any required devices and interfaces. For example, a bus/interface controller 740 may be used to facilitate communications between the basic configuration 701 and one or more data storage devices 750 via a storage interface bus 741. The data storage devices 750 may be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of device 700.

Computing device 700 may also include an interface bus 742 for facilitating communication from various interface devices (e.g., output interfaces, peripheral interfaces, and communication interfaces) to the basic configuration 701 via the bus/interface controller 740. Example output devices 760 include a graphics processing unit 761 and an audio processing unit 762, which may be configured to communicate to various external devices such as a display or speakers via one or more A/V ports 763. Example peripheral interfaces 770 include a serial interface controller 771 or a parallel interface controller 772, which may be configured to communicate with external devices such as input devices (e.g., keyboard, mouse, pen, voice input device, touch input device, etc.) or other peripheral devices (e.g., printer, scanner, etc.) via one or more I/O ports 773. An example communication device 780 includes a network controller 781, which may be arranged to facilitate communications with one or more other computing devices 790 over a network communication link via one or more communication ports 782.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configuration.

In various embodiments, various components of computing device 700 may include a PUF 704 in accordance with some embodiments of the present disclosure. For example, system memory 720 may include PUF 704, where PUF 704 may include a configuration to improve a stability of an output or response of the PUF 704, in accordance with various embodiments of the present disclosure. In additional or alternate embodiments, besides System Memory 720, one or more of processor 710, graphics processing units 761, audio processing unit 762, and/or application specific integrated circuit or field programmable circuit used for control circuitry of storage devices 750, bus interface controller 740, serial interface controller 771, parallel interface controller 772, and network controller 781 may also include embodiments of the PUF 704. In some embodiments, PUF 704 may be coupled to receive an input from an event generator, where the input may include one or more challenges to enable or disable an integrated circuit in one or more of the components of computing system 700.

FIG. 8 illustrates an example article of manufacture having a computer program product, in accordance with various embodiments of the present disclosure. The example computer program product 800 may comprise a computer readable storage medium 832 and a plurality of programming instructions 834 stored in the computer readable medium 832. In various ones of these embodiments, the programming instructions 834 may include instructions for determining a key to be stored in an IC for responding to an output of a PUF of the IC for controlling the IC. In various embodiments, the programming instructions 834 may additionally or alternatively include instructions for providing an input to an event generator of the IC to cause the event generator to generate an event for the PUF to provide the output.

Some embodiments may have some or all of the instructions depicted in FIG. 8. Embodiments of computer program product 800 may have other instructions in accordance with embodiments described herein. The computer readable medium 832 may take a variety of forms including, but not limited to, volatile and persistent memory, such as, but not limited to, a compact disk (CD), a digital versatile disk (DVD), a solid-state drive, a hard drive, and so forth. Embodiments are not limited to any type or types of computer program products.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

In the preceding description, various aspects of claimed subject matter have been described. For purposes of explanation, specific numbers, systems and/or configurations were set forth to provide a thorough understanding of claimed subject matter. However, it should be apparent to one skilled in the art and having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now, or in the future, occur to those skilled in the art. It is, therefore, to be understood that the appended claims are intended to cover all such modifications and/or changes as fall within the true spirit of claimed subject matter.

There is little distinction left between hardware and software implementations of aspects of systems; the use of hardware or software is generally (but not always, in that in certain contexts the choice between hardware and software become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

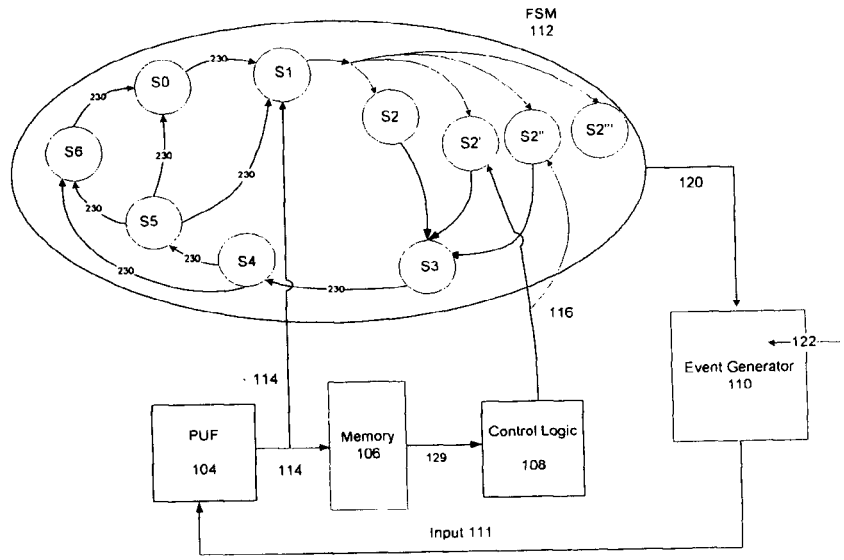

What is claimed is:

1. An apparatus, comprising:
   a finite state machine (FSM) of an integrated circuit (IC), the FSM having a plurality of states including a first state, a second state, and a replicated variant of the second state;
   a control logic of the IC, coupled with the FSM;
   an event generator of the IC coupled to the FSM; and
   a robust physically unclonable function (PUF) circuit of the IC, coupled with the control logic and the event generator, wherein the robust PUF circuit is configured to receive an input from the event generator and in response, provide an output to the FSM and the control logic to control, respectively, transition of the FSM from the first state to the second state or to the replicated variant of the second state in lieu of the second state, and transition of the FSM out of the replicated variant of the second state when the output to the FSM caused the FSM to transition from the first state to the replicated variant of the second state in lieu of the second state, and wherein the event generator is configured to generate the input for the robust PUF circuit based at least in part on a first signal from the FSM, representative of a current state of the FSM, and a signal from a source external to the IC.

2. The apparatus of claim 1 further comprising a memory coupled with the robust PUF circuit and the control logic, and configured to store a key, wherein the memory is configured to provide the key as an input to the control logic in response to an output from the robust PUF circuit, to control transition of the FSM out of the replicated variant of the second state when the output to the FSM caused the FSM to transition from the first state to the replicated variant of the second state in lieu of the second state.

3. The apparatus of claim 1 wherein the replicated variant of the second state is a selected one of a black hole state or a gray hole state.

4. The apparatus of claim 1, wherein the robust PUF comprises a main PUF and a delay PUF coupled to the main PUF.

5. The apparatus of claim 1 wherein the robust PUF circuit comprises first and second delay paths coupled to an arbiter, the first and second delay paths configured to generate for a particular input, a delay margin between an output of each of the first and the second delay paths.

6. The apparatus of claim 5 wherein the first and the second paths comprise at least one of an even number of inverters or a tapped delay line.

7. The apparatus of claim 5 further comprising an additional delay path to be used by the first and/or second path.

8. The apparatus of claim 1 wherein the apparatus comprises a selected one of a mobile phone, a laptop computer, or a desktop computer.

9. A method for controlling an integrated circuit (IC), comprising:
receiving by a computing device having a processor and memory, a plurality of values generated by a robust physically unclonable function (PUF) circuit embedded in the IC;
using, by the computing device, the plurality of received values and transition information related to a first state, a second state, and a replicated variant of the second state of a finite state machine (FSM) of the IC to generate a key to control the FSM's transitioning out of the replicated variant of the second state when the FSM transitioned from the first state to the replicated variant of the second state in lieu of the second state; and
outputting the key by the computing device, for use to control the IC.

10. The method of claim 9, wherein receiving by the computing device, the plurality of values generated by the robust PUF circuit, includes receiving an output of the robust PUF circuit created in part by a response to intrinsic manufacturing variability of the IC, intentional manufacturing variability of the IC, or a combination of both.

11. The method of claim 9, wherein the second state comprises a set of functions, and the replicated variant of the second state comprises a reduced set of the functions, and using the plurality of received values and transition information to generate a key comprises using the plurality of received values and transition information to control the FSM's transitioning out of the replicated variant of the second state having the reduced set of function when the FSM transitioned from the first state to the replicated variant of the second state with the reduced set of functions.

12. The method of claim 9, further comprising storing the key in a memory of the IC, the memory being coupled to the robust PUF and a control block of the IC and configured to output the key to the control block, responsive to an output of the robust PUF, for the control block to control the FSM's transitioning out of the replicated variant of the second state.

13. A method for controlling an integrated circuit, comprising:
determining, by a computing device having a processor and memory, a data for input to an event generator of an integrated circuit (IC) to cause the event generator to generate an event for a robust physically unclonable function (PUF) circuit of the IC, to cause the robust PUF to generate an output for a Finite State Machine (FSM) and a control block of the IC to control, respectively, the FSM's transition from a first state to either a second state or a replicated variant of the second state in lieu of the second state; and the FSM's transition out of the replicated variant of the second state; and
transmitting the data, by the computing device, to the IC to control the IC.

14. The method of claim 13, wherein transmitting the data to the IC comprises wirelessly transmitting the data to the IC to remotely control an activation or deactivation of the integrated circuit.

15. The method of claim 13, wherein transmitting the data to the IC comprises transmitting the data to the IC to remotely cause an activation or deactivation of selected functions of the IC.

16. The method of claim 13, wherein determining comprises searching by the computing device for $\delta$-stable input challenges including
starting with a randomly selected current challenge, and
implying iterative improvement paradigm where at each iteration all challenges $c_i$ with Hamming distance of 1 with respect to the current challenge is evaluated,
wherein if there is at least one $c_i$ challenge that has higher stability, the new current solution is selected as the most stable $c_i$ challenge, and
if there is no such challenge, enhance the search to include challenges that are on Hamming distance of two, three, or more from the current challenge.

17. The method of claim 16, further comprising terminating the iterative paradigm employing, one or more termination criteria of:
Hamming distance between the current and a new challenge
maximal running time for the iterative paradigm,
the moment when a maximal measurable $\delta$ is achieved, and
a satisfactory $\delta$ value is found.

18. An article of manufacture comprising:
a non-transitory computer readable medium; and
a plurality of programming instructions stored in the non-transitory computer readable medium, wherein the instructions when executed by a processor of an apparatus having the processor and memory, cause the apparatus to:
receive a plurality of values generated by a robust physically unclonable function (PUF) circuit embedded in the IC;

use the plurality of received values and transition information related to a first state, a second state, and a replicated variant of the second state of a finite state machine (FSM) of the IC to generate a key to control the FSM's transitioning out of the replicated variant of the second state when the FSM transitioned from the first state to the replicated variant of the second state in lieu of the second state; and output the key by the computing device, for use to control the IC.

19. The article of claim 18, wherein receive the plurality of values generated by the robust PUF circuit, includes receive an output of the robust PUF circuit created in part by a response to intrinsic manufacturing variability of the IC, intentional manufacturing variability of the IC, or a combination of both.

20. An article of manufacture comprising:
a non-transitory computer readable medium; and
a plurality of programming instructions stored in the non-transitory computer readable medium, wherein the instructions when executed by a processor of an apparatus having the processor and memory, cause the apparatus to:
determine a data for input to an event generator of an integrated circuit (IC) to cause the event generator to generate an event for a robust physically unclonable function (PUF) circuit of the IC, to cause the robust PUF to generate an output for a Finite State Machine (FSM) and a control block of the IC to control, respectively, the FSM's transition from a first state to either a second state or a replicated variant of the second state; and the FSM's transition out of the replicated variant of the second state; and
transmit the data to the IC to control the IC.

21. The article of claim 19, wherein when executed, the instructions cause the apparatus to wirelessly transmit the data to the IC to remotely control an activation or deactivation of the IC.

* * * * *

UNITED STATES PATENT AND TRADEMARK OFFICE
CERTIFICATE OF CORRECTION

PATENT NO.         : 8,387,071 B2
APPLICATION NO.    : 12/550132
DATED              : February 26, 2013
INVENTOR(S)        : Potkonjak et al.

It is certified that error appears in the above-identified patent and that said Letters Patent is hereby corrected as shown below:

Delete the title page and substitute the attached title page therefor.

Title Page 2, in Item (56), under "OTHER PUBLICATIONS", in Column 2, Line 30, delete "Sytems," and insert -- Systems, --, therefor.

Title Page 2, in Item (56), under "OTHER PUBLICATIONS", in Column 2, Line 32, delete "Circuits"" and insert -- Circuits," --, therefor.

In the Drawings:

In Fig. 7, Sheet 7 of 8, delete "uP / uC / DSP" and insert -- μP / μC / DSP --, therefor.

In the Specifications:

In Column 4, Line 54, delete "S2'" or S2'"." and insert -- S2" or S2'". --, therefor.

In Column 3, Line 44, delete "S2' S2"" and insert -- S2', S2" --, therefor.

In Column 3, Line 46, delete "S2' S2"" and insert -- S2', S2" --, therefor.

In Column 7, Line 30, delete "one or" and insert -- or --, therefor.

In the Claims:

In Column 14, Line 39, in Claim 16, delete "including" and insert -- including: --, therefor.

In Column 14, Lines 53-54, in Claim 17, delete "challenge" and insert -- challenge, --, therefor.

Signed and Sealed this
Sixteenth Day of July, 2013

Teresa Stanek Rea
*Acting Director of the United States Patent and Trademark Office*

CERTIFICATE OF CORRECTION (continued)

(12) United States Patent
Potkonjak et al.

(10) Patent No.: US 8,387,071 B2
(45) Date of Patent: Feb. 26, 2013

(54) CONTROLLING INTEGRATED CIRCUITS INCLUDING REMOTE ACTIVATION OR DEACTIVATION

(75) Inventors: Miodrag Potkonjak, Los Angeles, CA (US); Farinaz Koushanfar, Houston, TX (US)

(73) Assignee: Empire Technology Development, LLC, Wilmington, DE (US)

( * ) Notice: Subject to any disclaimer, the term of this patent is extended or adjusted under 35 U.S.C. 154(b) by 713 days.

(21) Appl. No.: 12/550,132

(22) Filed: Aug. 28, 2009

(65) Prior Publication Data
US 2011/0055851 A1    Mar. 3, 2011

(51) Int. Cl.
*G06F 9/44* (2006.01)
(52) U.S. Cl. .............................. 719/318; 326/8
(58) Field of Classification Search .............. None
See application file for complete search history.

(56) References Cited

U.S. PATENT DOCUMENTS

| | | | |
|---|---|---|---|
| 2010/0122353 A1* | 5/2010 | Koushanfar et al. | 726/33 |
| 2010/0293612 A1* | 11/2010 | Potkonjak | 726/20 |

FOREIGN PATENT DOCUMENTS

| | | |
|---|---|---|
| WO | 2009024913 | 2/2009 |
| WO | 2010060005 | 5/2010 |

OTHER PUBLICATIONS

Alkabani et al., "Remote Activation of ICs for Piracy Prevention and Digital Right Management," Proceedings of the 2007 IEEE/ACM International Conference on Computer-aided Design, Nov. 2007, pp. 674-677.*
Alkabani et al., "Active Hardware Metering for Intellectual Property Protection and Security," Proceedings of the 16th USENIX Security Symposium, Aug. 2007, pp. 291-306.*
International Search Report and Written Opinion, issued in International Patent Application No. PCT/US2010/045004, mailed Oct. 25, 2010, 13 pages.
Hammouri et al., "Novel PUF-based Error Detection Methods in Finite State Machines," Proceedings of the 11th International Conference on Information Security and Cryptology, Dec. 2008, 18 pages.
Alkabani et al., "Input Vector Control for Post-Silicon Leakage Current Minimization in the Presence of Manufacturing Variability," Design Automation Conference 2008, Jun. 2008, pp. 606-609.
Alkabani et al., "Trusted Integrated Circuits: A Nondestructive Hidden Characteristics Extraction Approach," Information Hiding: 10th International Workshop, May 2008, pp. 102-117.
Beckmann et al., "Hardware-Based Public-Key Cryptography with Public Physically Unclonable Functions," Information Hiding: 11th International Workshop, Jun. 2009, pp. 206-220.
Dabiri et al., "Hardware Aging-Based Software Metering," Proceedings of the Conference on Design, Automation and Test in Europe, Apr. 2009, pp. 460-465.

(Continued)

*Primary Examiner* — Crystal L. Hammond
(74) *Attorney, Agent, or Firm* — Steven S. Rubin, Esq.; Moritt Hock & Hamroff LLP

(57) ABSTRACT

Techniques are generally described for transitioning a Finite State Machine (FSM) of an integrated circuit from a first state to a second state or a replicated variant of the second state in lieu of the second state, and out of the replicated variant of the second state, using a robust physically unclonable function (PUF), an event generator and a control block of the IC. In various embodiments, the techniques leverage on manufacturing variability of the IC. In various embodiments, the techniques are employed to control activation or deactivation of the IC. Other embodiments may be disclosed and claimed.

21 Claims, 8 Drawing Sheets